United States Patent [19]

Costenoble

[11] 4,078,123

[45] Mar. 7, 1978

[54] SPIRAL-WRAPPED MULTI-LAYER CELL SEPARATOR

[75] Inventor: Ullrich Costenoble, Ellwangen, Germany

[73] Assignee: Varta Batterie Aktiengesellschaft, Germany

[21] Appl. No.: 753,855

[22] Filed: Dec. 23, 1976

[51] Int. Cl.² ............................................ H01M 2/18
[52] U.S. Cl. .................................. 429/141; 429/145; 156/188
[58] Field of Search .............. 429/141, 140, 144, 145; 29/623.3, 623.4, 623.5; 156/195, 184, 187, 188, 314

[56] References Cited

U.S. PATENT DOCUMENTS

| | | | |
|---|---|---|---|
| 2,163,366 | 8/1939 | Slayter | 429/141 |
| 2,511,887 | 6/1950 | Vinal | 429/144 |
| 2,609,407 | 9/1952 | Salisbury-Rowswell | 429/140 |
| 2,823,244 | 2/1958 | Brown | 429/141 X |
| 3,097,975 | 7/1963 | Horn et al. | 429/141 |
| 3,503,807 | 3/1970 | Sundberg | 429/141 |

Primary Examiner—Charles F. LeFevour
Attorney, Agent, or Firm—Weiser, Stapler & Spivak

[57] ABSTRACT

Inner and outer spiral-wrapped layers with adhesive between them form a sleeve. The adhesive is then activated. The outer layer covers at least the adjoining edges of the inner layer.

9 Claims, 1 Drawing Figure

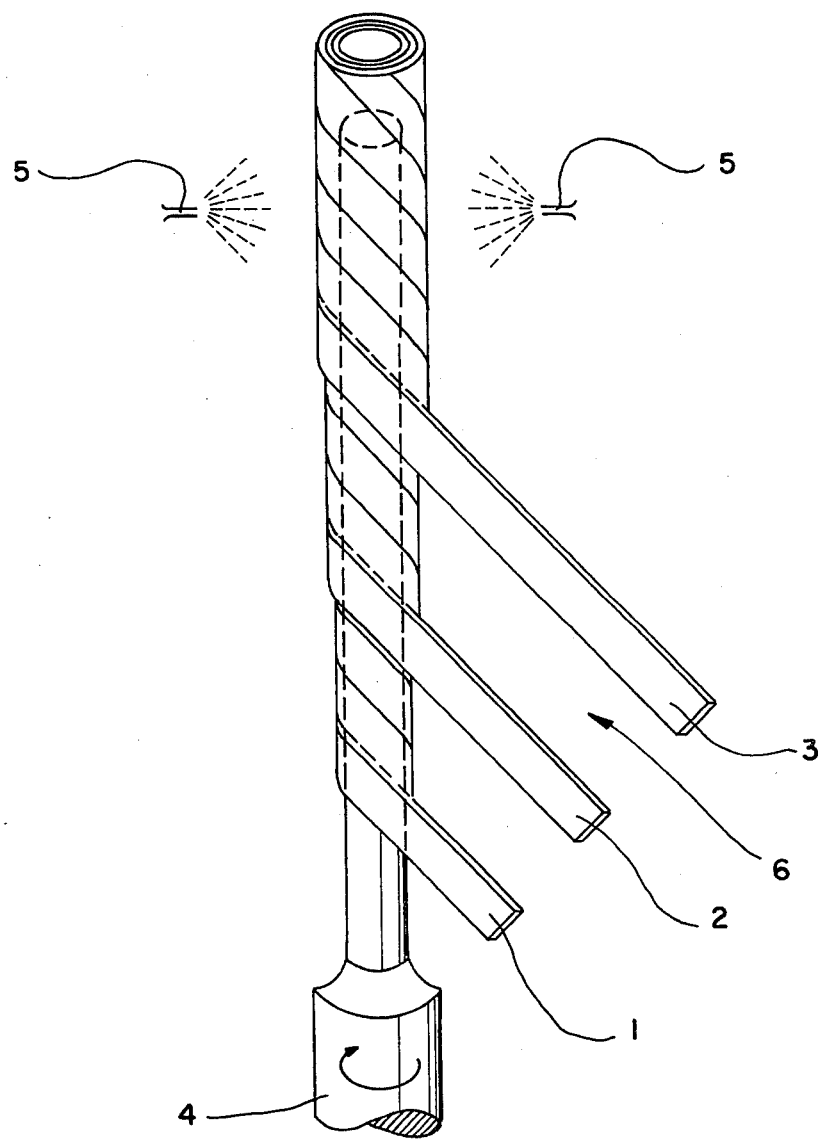

SPIRAL-WRAPPED MULTI-LAYER CELL SEPARATOR

The invention relates to a galvanic primary element with spirally-wrapped multi-layer separator.

More particularly, the subject of the invention is a separator sleeve for cylindrical cells having $MnO_2$, $Ag_2O$, AgO or HgO depolarizer, or rather a depolarizer of mixtures of these compounds and alkaline electroytes, in which prefabricated separator sleeves are used which are made of matting, fabric, or microporous foils. The matting, fabric or foil are preferably produced of cotton, polyamide, polypropylene, or polacryl nitrile fibers or mixtures of these products.

Separators for alkaline primary elements having cylindrical form are produced and inserted into the cells by the most varied processes.

The best-known process involves forming a rectangular piece of matting or fabric into a tube which is then inserted into the cell. The lower end of this wrapping or tube is closed off by a pushed-in bottom cap of the same material. The disadvantages of this process, particularly for cylindrical cells of small diameter, resides in that there are many diffculties involved in accomplishing such wrapping and insertion automatically and using machinery. In particular, the bottom caps, after having been pushed in, are partially pulled out again by the insertion plunger due to a pinching effect.

In accordance with another known process, two separator strips superposed at right angles are pushed into the cylindrical cell over guide shoulders in such a manner that one strip width constitutes at least one-half the circumference of the separator sleeve. The outer strip facing the previously inserted ring-shaped positive electrode then bridges the two adjacent edges of the inner separator strip. Its disadvantage is that it is difficult to mechanize. Particularly disadvantageous is the fact that the ends of the strips protrude without guidance or support, so that during insertion of the sealing elements the strip ends are susceptible to uncontrollable bending.

Still another known type of separators are prefabricated sleeves with folded-over bottoms. The sleeves are wrapped in three layers from a rectangular piece and then glued together. A disadvantage of these is the longitudinal seam. Especially when synthetic matting is used, this leads to a deformation of the circular cross-section and hence to nonuniform adjacency of the separator sleeves to the positive cylindrical electrodes. Moreover, the manufacture of such sleeves is very costly.

Separators which are wrapped in the form of a spiral and inserted in alkaline cylindrical cells are disclosed in German patent publication (Auslegeschrift) No. 1,421,582. However, no disclosure is provided there of their construction and method of manufacture.

Accordingly, the present invention has as its object the manufacture of a separator sleeve made of spiral-wrapped material.

It is another object to provide such a sleeve which can be produced simply and continuously in large quantities.

Still another object is to provide such a separator sleeve which is capable of absorbing the introduced electrolyte in the shortest possible time, of distributing it, and binding it in place, thereby achieving both separation and positioning of the electrolyte layer between anode and cathode.

These objects and others which will appear are achieved in accordance with the invention by making the separator sleeve of an inner spiral-wrapped layer and an outer absorbent spiral-wrapped layer. These are joined together by an adhesive layer in the form of a synthetic plastic foil, wrapped spirally about the inner layer and covering the inner layer at least in the region of adjoining edges. Both the inner and outer layer may be of microporous foil. However, it is also possible to use a pore-free foil for the inner layer and an absorbent microporous foil for the outer layer.

For further details, reference is made to the discussion which follows in the light of the accompanying drawing, wherein the single FIGURE illustrates somewhat diagrammatically the technique for manufacturing an embodiment of the invention and also the resulting product.

In that FIGURE, there is shown an inner layer 1, the adhesive layer 2, and the outer layer 3. All of these are wrapped about winding mandrel 4. Spray nozzles 5 are diagrammatically illustrated for spraying on of water or solvent. The direction of movement is indicated by arrow 6. The mattings or fabrics shown preferably have thicknesses of about 0.1 to 0.2 millimeters and strip widths of about 10 to 20 millimeters.

The adhesive layer is preferably of synthetic plastic foil and may consist of polyvinyl alcohol. However, cellulose derivatives may also be used.

The preferred process for the manufacture of such a separator sleeve involves wrapping the inner layer 1 spirally upon a mandrel. Upon this layer an adhesive layer 2 is spirally placed. Upon these layers there is then wrapped spirally an absorbent outer layer provided with a solvent. It will be understood that the inner layer, the synthetic plastic foil and the outer layer may also be spirally wound consecutively upon each other and thereafter the entire winding may be sprayed with a solvent for the synthetic plastic foil or synthetic plastic middle layer.

By using, in accordance with the invention, a foil-like adhesive layer, numerous special advantages accrue. If the individual layers were joined simply by a low viscosity adhesive, during manufacture this would penetrate into the matting and distribute itself so quickly that insufficient adhesive effect would remain for attachment of the second layer of matting. In addition, the mattings would then have lost a large part of their absorptiveness for the electrolyte which they must subsequently take up. On the other hand, use of a high viscosity adhesive would lead to the formation of surface film on the matting, and this pronounced film formation would cause the adhesive to act as a strong inhibitor to the separator properties. The solvent in such an adhesive layer would have to be eliminated through extended evaporation or drying periods during spiral wrapping; otherwise, upon removal of the sleeve from the machine, the spiral could again unravel.

When adhesives are used which are redissolved by subsequently introduced liquid solvent, the sleeve end of the separator which protrudes from the tubular positive electrode can again unravel and cause short-circuits in the cell if the zinc paste contacts the positive electrode.

For the adhesive layer, there is therefore preferably wrapped a strip of synthetic plastic, as for example, in accordance with the following process.

After the first layer of separator matting or fabric has been mounted on the winding mandrel, there follows a strip of polyvinyl alcohol foil, preferably of a thickness of between about 0.02 to 0.04 millimeters which is soluble either warm or cold. This layer may be wrapped over the first layer diagonally, or in alignment with it, or overlappingly. The third layer then consists again of suitable matting material. However, in the case of polyvinyl alcohol foil, this has previously been passed through an aqueous bath and is therefore soaked with water. The wetted strip is wrapped over the previously spirally mounted polyvinyl alcohol foil, which is thereby dissolved throughout its entire thickness. It thereby develops strong adhesive properties and effects the adhesion between the two matting layers. The polyvinyl alcohol foil acts as adhesive and also as separator material, in a manner which is known in itself.

In lieu of a closed polyvinyl alcohol strip, a perforated foil or a fabric strip of polyvinyl alcohol may also be used. A narrow strip may also be used to merely glue the gap together. Wetting may, for example, also be accomplished by spraying of the outer matting layer which previously had been wrapped in the dry state. Through radiation or hot air the necessary drying process on the winding mandrel can be accelerated.

In place of polyvinyl alcohol foils or fabrics, it is possible to utilize synthetic plastic foils which are dissolved or activated by suitable solvents. Very well suited for this purpose are cellulose derivatives such as cellulose acetate or cellulose triacetate, which are also effective and known for use as separators. There too, the use of woven or perforated strips is possible (acetate rayon). As solvent there is suitable, for example, dichlormethane (methylene chloride) or acetone. As a further possibility, synthetic foils may be used which are also activated into adhesive by means of solvents, but which later disintegrate under the influence of the solvent liquid. These substances include, for example, polycarbonate or polyester foils. As solvents there are then suitable methyl chloride and ethylene chloride or, in the case of polyester foils, benzyl alcohol or resorcinol solution.

What may be particularly appropriate is to make the inner layer of cellulose acetate foil which is not soluble in water, the intermediate layer of a polyvinyl alcohol foil which is susceptible of activation by water, and as the outer layer a cellulose matting or synthetic matting. Another especially desirable possibility involves using as the inner layer a polyvinyl alcohol or cellulose foil which is not soluble in the solvent, to use as the intermediate layer cellulose acetate foil which is susceptible to activation with the solvent, and to use as the outer layer a cellulose or synthetic plastic matting layer.

The particular advantages of these spiral windings of the separator foil with intermediate adhesive foil which also possesses separator activity reside especially in the possibility of continuous production at high rates. By using an adhesive foil, trouble-free predetermined distribution of the adhesive is achieved. If foils are used which are glued together with matting layers, only individual fibers of the outer fiber surface contact each other. The foils do not penetrate into the matting material, as would be the case with adhesives or liquids, and there arises a floating film layer which does not diminish the absorptive properties of the separator layers. Moreover it is possible to use perforated or woven layers, which is not possible when an adhesive is used. When necessary, e.g. for $Ag_2O$, $AgO$ or $HgO$ depolarizers, the adhesive foil can remain in the form of a pore-free film and act as additional separator.

I claim:

1. The method of manufacturing a separator sleeve for a galvanic element, comprising:
   spirally wrapping upon a mandrel an inner layer of separator foil,
   spirally wrapping directly upon said inner layer so as to cover at least the adjoining edges of the inner layer an intermediate layer of a synthetic plastic foil which is substantially solid and non-adhesive in the state in which it is wrapped but which is soluble and becomes adhesive without the application of external pressure or heat in response to an activating liquid,
   spirally wrapping directly upon the intermediate layer an outer layer of separator foil, and
   applying said activating liquid in the absence of external pressure or heat,
   whereby the intermediate layer becomes adhesive and securely joins the inner and outer layers without the application of external pressure or heat.

2. The method of claim 1 wherein both the inner and outer layers are of microporous foil.

3. The method of claim 1 wherein the inner layer is a pore-free foil and the outer layer is an absorbent mircroporous foil.

4. The method of claim 1 wherein the synthetic foil forming the intermediate layer is of polyvinyl alcohol.

5. The method of claim 1 wherein the foil forming the intermediate layer is of cellulose derivative.

6. The separator sleeve manufactured by the method of claim 1.

7. A galvanic primary element including the separator sleeve of claim 6 and positive and negative electrodes separated by the sleeve.

8. The element of claim 7 wherein the outer absorbent layer of the sleeve contains an alkaline electrolyte.

9. The method of claim 1 wherein the liquid is applied by spraying after wrapping of the outer layer.

* * * * *